US008281077B2

(12) United States Patent
Hyatt (10) Patent No.: US 8,281,077 B2
(45) Date of Patent: Oct. 2, 2012

(54) LOCAL MEDIA CACHE WITH LEADER FILES

(75) Inventor: Edward C. Hyatt, Durham, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 1484 days.

(21) Appl. No.: 11/608,373

(22) Filed: Dec. 8, 2006

(65) Prior Publication Data

US 2008/0139189 A1   Jun. 12, 2008

(51) Int. Cl.
*G06F 12/00* (2006.01)
(52) U.S. Cl. ........... 711/133; 711/E12.041; 711/E12.07; 711/136; 455/418
(58) Field of Classification Search .................. 711/136; 455/418
See application file for complete search history.

(56) References Cited

U.S. PATENT DOCUMENTS

| | | | |
|---|---|---|---|
| 5,870,553 A * | 2/1999 | Shaw et al. | 709/219 |
| 6,553,376 B1 | 4/2003 | Lewis et al. | |
| 6,813,684 B2 * | 11/2004 | Sakaguchi et al. | 711/113 |
| 2002/0007392 A1 | 1/2002 | Buddhikot et al. | |
| 2004/0138948 A1 | 7/2004 | Loomis | |
| 2005/0166153 A1 | 7/2005 | Eytchison et al. | |
| 2006/0036342 A1 * | 2/2006 | Sasaki | 700/94 |

FOREIGN PATENT DOCUMENTS

JP   2006-172296 A   6/2006

OTHER PUBLICATIONS

Primetime Podcast Receiver ("PPR—Your Premier Podcast Receiver"), Apr. 25, 2005, pp. 1-2, http://web.archive.org/web/20050424234331/www.primetimepodcast.com/blog/default.aspx.*
Yuanyuan Zhou, ("Algorithms"), Apr. 29, 2001, pp. 1-2, http://www.usenix.org/event/usenix01/full_papers/zhou/zhou_html/node3.html.*
Topshareware, ("001 Joiner"), Nov. 6, 2003, pp. 1-2, http://www.topshareware.com/001-Joiner-download-8773.htm.*
SearchCRM, ("Integration"), Mar. 26, 1998, pp. 1-9, http://searchcrm.techtarget.com/definition/integration.*
IEEE, ("The Authoritative Dictionary of IEEE Standards Terms"), Seventh Edition, 2000, p. 571.*
International Preliminary Report on Patentability for corresponding International Application No. PCT/US2007/072489 dated Feb. 24, 2009.
International Search Report and Written Opinion for International Application No. PCT/US2007/072489 dated May 9, 2008.

* cited by examiner

*Primary Examiner* — Edward Dudek, Jr.
*Assistant Examiner* — Christopher Birkhimer
(74) *Attorney, Agent, or Firm* — Renner, Otto, Boisselle & Sklar, LLP (57) ABSTRACT

An apparatus and method for providing media content to electronic equipment includes transferring media content to the electronic equipment, and using rules to determine how pre-existing media content and the cached media content are stored in memory when free memory in the electronic equipment is insufficient to store the cached media content. At least part of the transferred media content is cached in memory of the electronic equipment for use at a later time.

23 Claims, 4 Drawing Sheets

LOCAL MEDIA CACHE WITH LEADER FILES

TECHNICAL FIELD OF THE INVENTION

The present invention relates generally to electronic equipment, such as electronic equipment for engaging in voice communications and/or for playing back audiovisual content to a user. More particularly, the invention relates to a device and method for caching files on electronic equipment for later use.

DESCRIPTION OF THE RELATED ART

Mobile and/or wireless items of electronic equipment are becoming increasingly popular. For example, mobile phones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability and hands-free headset interfaces.

Media content, such as audio and/or visual media content, may be transferred to the electronic equipment for immediate playback or for playback at a later time. This transfer may be in the form of a communication link established between the electronic equipment and another device (e.g., a short range communication link between the electronic equipment and a PC, another electronic equipment, etc.). Alternatively, the media content may be transferred between devices via a removable memory card. Yet another means for transferring media content to the electronic equipment may be via an internet connection with a music server (e.g., via a music purchasing service or the like). Another means for transferring media content may be via podcast. As will be appreciated, there are numerous ways in which media content may be transferred to/from electronic equipment.

In addition to locally stored media content, media content may be enjoyed on the electronic equipment via a streaming connection. For example, the electronic equipment, via a WiFi connection or the like, may receive media content in a streamed format, which then can be played on the electronic equipment. Often, however, the available bandwidth of the WiFi connection is not sufficient to support high quality media content (e.g., media content with high bit rates and/or high video resolution). Further, because of network congestion, poor signal quality, and/or other factors, the streamed media content may be interrupted during playback. As a result, the experience created by the streamed media content may be less satisfying than the experience created by locally stored media content.

SUMMARY

The amount of media content that may be stored on the electronic equipment is a function of the available memory on the electronic equipment (e.g., internal or fixed memory of the electronic equipment and removable memory modules). As is often the case, a user of such electronic equipment often fills all of the available memory with media content, such as music and/or movies. Over time, the user may have listened to and/or viewed all of the media content stored in memory of the electronic equipment and, thus, desire new or additional media content.

One way that media content may be obtained is by streaming the media content to the electronic equipment. Conventional electronic equipment, however, provide unsatisfactory results when streaming media content to the electronic equipment. Often, the streamed media content is of low quality (e.g., lower than locally stored media content) and/or the stream may be interrupted due to various factors, thereby cutting off the media content all together.

The present invention provides a method and apparatus that enables a user to enjoy the high quality and high reliability of locally stored media content with the variety of streamed media content. This can be achieved by caching media content into memory of the electronic equipment using various replacement algorithms. Further, partial leader files, which include a portion of the media content, may be transferred to or otherwise created in the electronic equipment. The partial leader files enable a larger selection of media content to be stored on the electronic equipment. The remainder of the file can be downloaded while the media content is being played.

According to one aspect of the invention, a method for providing media content to electronic equipment includes transferring media content to the electronic equipment, wherein at least part of the transferred media content is cached in memory of the electronic equipment for use at a later time; and using rules to determine how pre-existing media content and the cached media content are stored in memory when free memory in the electronic equipment is insufficient to store the cached media content.

According to one aspect of the invention, transferring can include streaming the media content to the electronic equipment.

According to one aspect of the invention, using rules can include using weighting criteria to determine which pre-existing media content will be at least partially replaced by the cached media content. Further, using weighting criteria can include using rules based on at least one of age, use characteristics, a rating, a genre, a size, a play time, a quality, an artist or a title of the media content stored in memory, while using rules based on use characteristics of the media content can include using rules based on a number of times the media content has been skipped during execution or on a time period on non-use of the media content.

According to one aspect of the invention, using rules includes replacing at least part of the pre-existing media content with the cached media content when there is insufficient free memory for the cached media content, or caching at least part of the transferred media content when there is insufficient free memory to cache the entire media content.

According to one aspect of the invention, replacing at least part of the pre-existing media content includes creating at least one leader file for a remaining portion of the pre-existing media content. The leader filed can be executable to reproduce a portion of the pre-existing media content. As the leader file is executed, a remaining portion of the pre-existing media content can be transferred to the electronic equipment.

According to one aspect of the invention, caching at least part of the transferred media content can include creating a leader file for a transferred portion of the media content. The leader file can include creating a file that is executable to reproduce a portion of the transferred media content. As the leader file is executed, the remaining portion of the cached media content can be transferred to the electronic equipment.

According to one aspect of the invention, transferring can include automatically transferring media content to the electronic equipment at predetermined intervals.

According to one aspect of the invention, the method can further include at least one of selecting a source from which the media content is transferred, selecting a style of media content to be transferred to the electronic equipment, or enabling random selection of the transferred media content.

According to one aspect of the invention, an electronic equipment includes: a processor and memory; a radio circuit operative to establish wireless communications with other electronic equipment; and a local media cache circuit operative to cache at least part of incoming media content in memory and to apply rules to determine how pre-existing media content and the cached media content are stored in memory when free memory in the electronic equipment is insufficient to store the cached media content.

According to one aspect of the invention, the local media cache circuit can be operative to use weighting criteria to determine which pre-existing media content will be at least partially replaced by the cached media content.

According to one aspect of the invention, the local media cache circuit can be operative to replace at least part of the pre-existing media content with the cached media content when there is insufficient free memory for the cached media content, or to cache at least part of the transferred media content when there is insufficient free memory to cache the entire media content.

According to one aspect of the invention, the local media cache circuit can be operative to create at least one leader file for a remaining portion of the pre-existing media content.

According to one aspect of the invention, the local media cache circuit can be operative to transfer a remaining portion of the pre-existing media content when the leader file is executed.

According to one aspect of the invention, the local media cache circuit can be operative to create a leader file for a transferred portion of the media content.

According to one aspect of the invention, the local media cache circuit can be operative to transfer a remaining portion of the cached media content as the leader file is executed.

According to one aspect of the invention, the local media cache circuit can be operative to automatically transfer media content to the electronic equipment at predetermined intervals.

According to one aspect of the invention, the electronic equipment can be a mobile telephone.

According to one aspect of the invention, a computer program embodied in a computer readable medium for providing media content to electronic equipment includes: code that transfers media content to the electronic equipment, wherein at least part of the transferred media content is cached in memory of the electronic equipment for use at a later time; and code that uses rules to determine how pre-existing media content and the cached media content are stored in memory when free memory in the electronic equipment is insufficient to store the cached media content.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like.

In the present application, the invention is described primarily in the context of a mobile phone. However, it will be appreciated that the invention is not intended to be limited to a mobile phone and can be any type of electronic equipment.

As used herein, media content includes audio content (e.g., music and/or speech utilizing various formats including MP3, WMV, etc.) and/or video content (e.g., photographs or images, movies using no compression or various compression techniques such as MPEG, DIVX, etc.).

The present invention will now be described with reference to the drawings, wherein like reference numerals are used to refer to like elements throughout.

Figure 1:
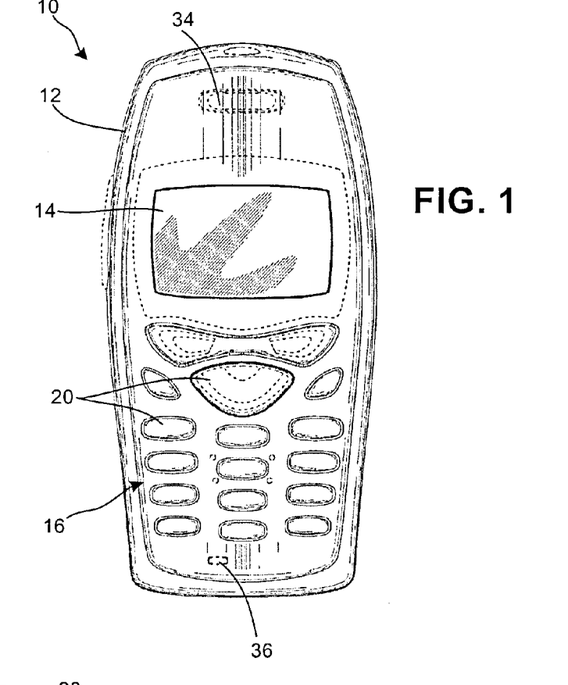
FIG. 1 is a schematic view of a mobile phone as an exemplary electronic equipment in accordance with an embodiment of the present invention.

Referring initially to FIG. 1, an electronic equipment 10 is shown in accordance with the present invention. The electronic equipment includes a local media cache function (described in more detail below) that is configured to provide a variety of high quality media content to a user's electronic equipment. It will be appreciated that the local media cache function may be embodied as executable code that may be resident in and executed by the electronic equipment 10.

The electronic equipment in the exemplary embodiment is a mobile phone and will be referred to as the mobile phone 10. The mobile phone 10 is shown as having a "brick" or "block" form factor housing 12, but it will be appreciated that other type housings, such as a clamshell housing or a slide-type housing, may be utilized without departing from the scope of the invention.

The mobile phone 10 includes a display 14 and keypad 16. As is conventional, the display 14 displays information to a user such as operating state, time, telephone numbers, contact information, various navigational menus, etc., which enable the user to utilize the various features of the mobile phone 10. The display 14 may also be used to visually display content received by the mobile phone 10 and/or retrieved from a memory 18 (FIG. 2) of the mobile phone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile phone may include a volume key, an audio mute key, an on/off power key, a web browser launch key, a camera key, etc. Keys or key-like functionality may also be embodied as a touch screen associated with the display 14.

The mobile phone 10 includes conventional call circuitry that enables the mobile phone 10 to establish a call and/or exchange signals with a called/calling device, typically another mobile phone or landline telephone. However, the called/calling device need not be another telephone, but may be some other device such as an Internet web server, content-providing server, etc.

Figure 2:
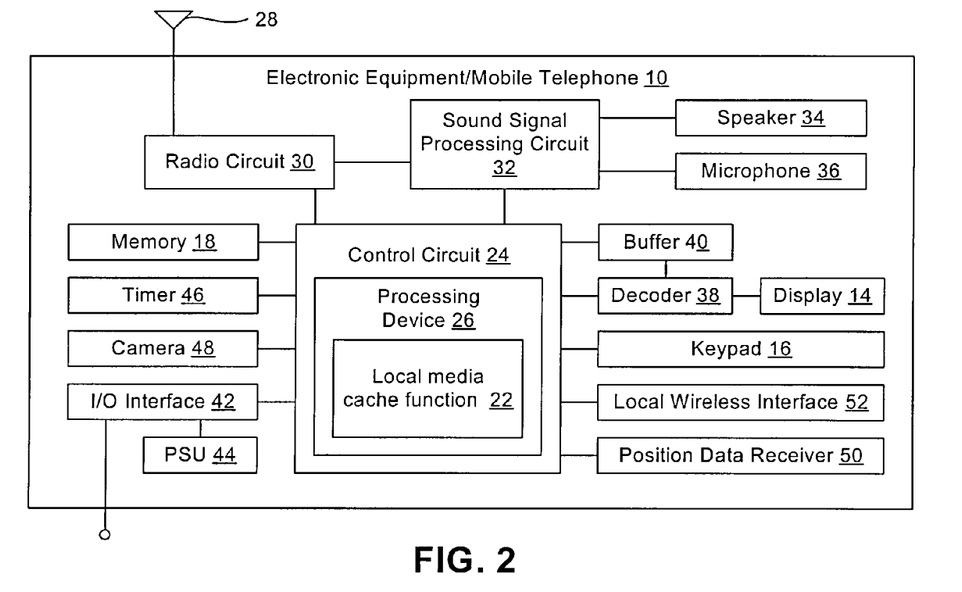
FIG. 2 is a schematic block diagram of the relevant portions of the mobile phone of FIG. 1 in accordance with an embodiment of the present invention.

FIG. 2 represents a functional block diagram of the mobile phone 10. With the exception of a local media cache function 22, which is preferably implemented as executable logic in the form of application software or code within the mobile phone 10, the construction of the mobile phone 10 is otherwise generally conventional. The mobile phone 10 includes a primary control circuit 24 that is configured to carry out overall control of the functions and operations of the mobile phone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile phone 10. The memory 18 may be, for example, one or more of a buffer, a flash memory, a hard drive, a removable media, a volatile memory, a non-volatile memory or other suitable device. In addition, the processing device 26 executes code in order to perform local media cache function 22.

It will be apparent to a person having ordinary skill in the art of computer programming, and specifically in applications programming for mobile phones or other items of electronic equipment, how to program a mobile phone 10 to operate and carry out the functions described herein. Accordingly, details as to the specific programming code have been left out for sake of brevity. Also, while the local media cache function 22 is executed by the processing device 26 in accordance with the preferred embodiment of the invention, such functionality could also be carried out via dedicated hardware, firmware, software, or combinations thereof, without departing from the scope of the invention. Any of these implementations may be referred to a local media cache circuit.

Continuing to refer to FIGS. 1 and 2, the mobile phone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive audiovisual content. For example, the receiver may be an IP datacast compatible receiver compatible with a hybrid network structure providing mobile communications and DVB-H based or similar services. Other receivers for interaction with a mobile radio network or broadcasting network are possible and include, for example, GSM, CDMA, WCDMA, MBMS, WiFi, WiMax, DVB-H, ISDB-T, etc.

The mobile phone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile phone 10 as is conventional. The radio circuit 30 and sound processing circuit 32 are each coupled to the control circuit 24 so as to carry out overall operation.

The mobile phone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18 or derived from an incoming video data stream received by the radio circuit 30. Prior to being fed to the decoder 38, the video data may be buffered in a buffer 40.

The mobile phone 10 further includes one or more I/O interface(s) 42. The I/O interface(s) 42 may be in the form of typical mobile phone I/O interfaces and may include one or more electrical connectors. As is typical, the I/O interface(s) 42 may be used to couple the mobile phone 10 to a battery charger to charge a battery of a power supply unit (PSU) 44 within the mobile phone 10. In addition, or in the alternative, the I/O interface(s) 42 may serve to connect the mobile phone 10 to a wired personal hands-free adaptor (not shown). Further, the I/O interface(s) 42 may serve to connect the mobile phone 10 to a personal computer or other device via a data cable. The mobile phone 10 may receive operating power via the I/O interface(s) 42 when connected to a vehicle power adapter or an electricity outlet power adapter.

The mobile phone 10 may also include a timer 46 for carrying out timing functions. Such functions may include timing the durations of calls, generating the content of time and date stamps, etc. The mobile phone 10 may include a camera 48 for taking digital pictures and/or movies. Image and/or video files corresponding to the pictures and/or movies may be stored in the memory 18. The mobile phone 10 also may include a position data receiver 50, such as a global positioning system (GPS) receiver, Galileo satellite system receiver or the like. The mobile phone 10 also may include a local wireless interface 52, such as an infrared transceiver and/or an RF adaptor (e.g., a Bluetooth adapter), for establishing communication with an accessory, hands-free adaptor, another mobile radio terminal, computer or other device.

The mobile phone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video and so forth. Processing such data may include storing the data in the memory 18, executing applications to allow user interaction with data, displaying video and/or image content associated with the data, broadcasting audio sounds associated with the data and so forth.

Figure 3:
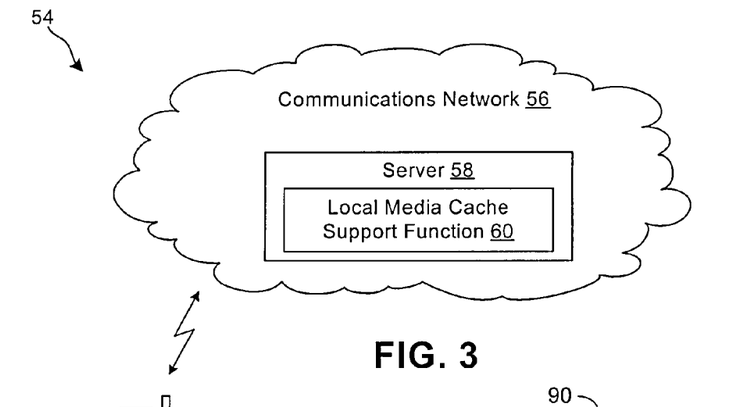
FIG. 3 is a schematic diagram of a communications system in which the mobile phone of FIG. 1 may operate.

With additional reference to FIG. 3, the mobile phone 10 may be configured to operate as part of a communications system 54. The system 54 may include a communications network 56 having a server 58 (or servers) for managing calls placed by and destined to the mobile phone 10, transmitting data to the mobile phone 10 and carrying out any other support functions. The server communicates with the mobile phone 10 via a transmission medium. The transmission medium may be any appropriate device or assembly, including, for example, a communications tower, another mobile phone, a wireless access point, a satellite, etc. Portions of the network may include wireless transmission pathways. The network 56 may support the communications activity of multiple mobile phones 10, although only one mobile phone 10 is shown in the illustration of FIG. 3.

In one embodiment, the server 58 may operate in stand alone configuration relative to other servers of the network 52 or may be configured to carry out multiple communications network 58 functions. As will be appreciated, the server 58 may be configured as a typical computer system used to carry out server functions and may include a processor configured to execute software containing logical instructions that embody the functions of the server 58. Those functions may include functions that are complimentary to the operation of the local media cache function 22 of the mobile phone 10, and will be collectively referred to as a local media cache support function 60.

The local media cache function 22 described herein enables media content (e.g., streamed media content or media content transferred via a different means) to be cached locally on the electronic equipment. For example, media content can be played from locally-stored play lists (e.g., music and/or movies stored in memory), and periodically new media content may be cached in memory such that it can be enjoyed at a later time. This enables the user to reliably listen to and/or watch a variety of media content even when a network connection is not available. Further, if the available memory within the electronic equipment is insufficient to cache additional media content, then existing media content may be replaced by the new media content.

Replacement of existing media content can be based on replacement rules that specify which media content should be selected for replacement. Replacement rules can be based on various criteria, including, for example, user ratings of the media content, actual playback of the media content, genre of the media content, artist and/or title of the media content, size or play time of the media content, etc.

Optionally, instead of completely replacing media content, one or more leader files may be created and stored in memory, wherein the leader file includes a portion (e.g., a clip of a predetermined length) of the media content. Then, as media content comprising a leader file is selected for playback, the media content immediately starts as if the entire media content was store on the electronic equipment. During playback, the remaining portion of the media content is downloaded in the background.

Figure 4:
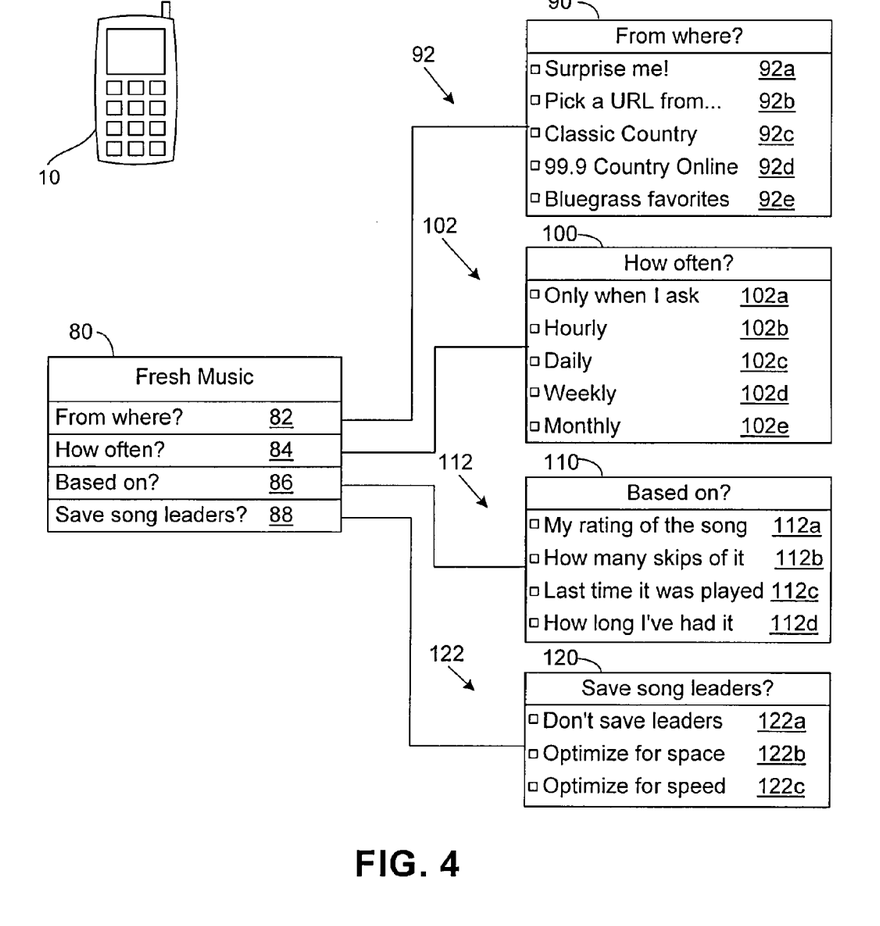
FIG. 4 illustrates exemplary menu screens that may be used to implement a local media cache function in accordance with the invention.

Configuration of the various options associated with the local media cache function 22 may be performed using menus that are displayed on the mobile phone display 14. With reference to FIG. 4, an exemplary menu structure for configuring the local media cache function is shown.

An exemplary main menu 80 (e.g., a "Fresh music" menu 80) provides a user with several options for configuring how the local media cache function 22 operates. The fresh music menu 80 includes, for example, a source option 82 for configuring a source for obtaining new media content, a frequency option 84 for configuring how often new media content will be added to the mobile phone 10, a weighting option 86 for configuring which media content should be replaced (e.g., in the event there is insufficient memory for the new media content), and a leader option 86 for configuring whether leader files will be used when creating media content.

As will be appreciated, the above menu options may be viewed on the display 14 of the mobile phone. Further, a user may navigate and/or make menu selections using the keypad 16, for example.

Selecting the source option 82 (e.g., the "From where?" option as shown on the exemplary menu), provides a source submenu 90 on the display 14. The source submenu 90 includes a number of selections 92 for configuring where new media content will be obtained. A first selection may be a random selection 92a (e.g., "Surprise me!"), wherein the local cache media content function 22 is free to select any source for the incoming media content. For example, when the "Surprise me!" entry 92a is selected, the local media cache function 22 may select any source for the media content, including other mobile phones, computers, servers, mp3 players, etc. that are in range of mobile phone 10 (e.g., via connections such as WiFi, Bluetooth, etc.).

Another option for the source of the media content is the "Pick a URL from" selection 92b. This option allows a user to specify a particular URL from which all media content will be cached to the mobile phone 10. For example, the user may enter a URL for a particular streaming server. This option may be advantageous for users who have a subscription service to streaming media content, for example.

Media content also may be streamed and cached from a particular provider, such as a radio station, television stations, etc. For example, user configurable radio station entries 92c and 92d allow the user to specify one or more on-line radio stations from which media content will be streamed to the mobile phone 10 (e.g., the user's favorite radio station). Alternatively, or in combination with, a genre selection 92e may be used to specify a genre of the media content (e.g., rock, Bluegrass, etc.). Using the genre selection 92e, the local media cache function 22 may scan available media content and determine if the media content matches the genre specified by the user. If a match is obtained, such media content can be marked for transfer to the mobile phone 10. The genre of media content can be identified using conventional techniques, e.g., via metadata associated with the media content file, wherein the metadata includes specific information pertaining to the media content.

Moving back to the main menu 80, the frequency option 84 allows the user to specify how often the local media cache function 22 updates media content on the mobile phone 10. A user, after selecting the frequency option 84, is presented with the exemplary frequency submenu 100. The user then may select one of the several frequency options 102 (e.g., when asked 102a, hourly 102b, daily 102c, weekly 102d, monthly 102e, etc.) so as to set an update schedule. Once a frequency period has been selected, the local media cache function 22 updates the media content on the mobile phone 10 based on the requested schedule (e.g., once per day, week, month, etc., or based on a specific user request).

As noted above, the user also may specify weighting criteria that can be used in determining which existing media content will be replaced or modified so as to make room for the incoming media content (e.g., when the available memory is insufficient for the new media content). Selecting the weighting option 86 presents the weighting submenu 110 on the display 14. The weighting submenu 110 provides a number of weighting options 112 that may be selected by the user. Exemplary weighting options include a user rating of the media content 112a (e.g., based on a user entered rating between 1 and 10, or some other scale), a number of times the media content has been skipped in a queue 112b, the last time the media content was played 112c, or on how long the media content has been stored 112d.

For example, if there is insufficient memory to add new media content, and the user has configured the replacement rules based on the how long the media content as been stored on the mobile phone (i.e., "How long I've had it" 112d), then the local media cache function 22 will search for the oldest media content in memory. This media content then will be marked for replacement by the incoming media content.

Moving back to the main menu 80, a user also may configure leader files by selecting the leader option 88, which displays the leader submenu 120 on the display 14. As described herein, a leader file is a file that includes at least a portion of the media content (e.g., a 30 second clip of a song, movie, etc.). Further, the leader file may include other information, such as a source from where the remainder of the leader file (e.g., the remainder of the media content) may be downloaded or streamed. This can be advantageous when files are copied between users. For example, if a particular media content in the form of a leader file is shared with another user, the source for the remaining portion of the media content is embedded in the leader file, thereby enabling quick and efficient retrieval by the receiving device. As will appreciated, there are a number of ways in which copying of leader files can be handled, including copying with the URL-bearing resource, forcing a download of the entire media content, or simply not allowing such files to be copied.

Using leader files, the mobile phone 10 can appear to store more media content than the physical memory space would allow, thereby increasing the playback options for the user. When media content that comprises a leader file is selected for playback, the local media cache function 22 begins playing the media content, and also proceeds to download the remaining portion of the media content in the background. The entire process can be transparent to the user, such that it appears that the entire media content resides on the mobile phone 10.

From the leader submenu 120, several leader options 122 are provided. A first option can be to not use leader files, in which case the "Don't save leaders" option 122a is selected. Alternatively, the user may configure leader files such that space is optimized by selecting the "Optimize for space" option 122b, or to optimize for speed by selecting the "Optimize for speed" option 122c.

The Optimize for space entry 122b configures the local media cache function 22 to use small leader files, thereby enabling a larger variety of media content to be stored on the mobile phone 10. A drawback to using small leader files, however, is that the missing portion forms a large part of the media content, which can present problems if network connections are congested to the point that playback is interrupted. The occurrence of this problem can be minimized by selecting the optimize for speed option 122c. This option configures the local media cache function 22 to store larger leader files and, thus, minimizes the amount of data that needs to be obtained from a remote source should the leader file be selected for playback. A drawback, however, is that the larger leader files limit the number of different leader files (and other media content) that may be stored in the mobile phone 10.

In addition to the options shown in the leader submenu, other options may be included. For example, a selection may be available to determine if leader files will be created from the existing media content or from the incoming media content. As will be appreciated, other options also can be implemented.

Figure 5:
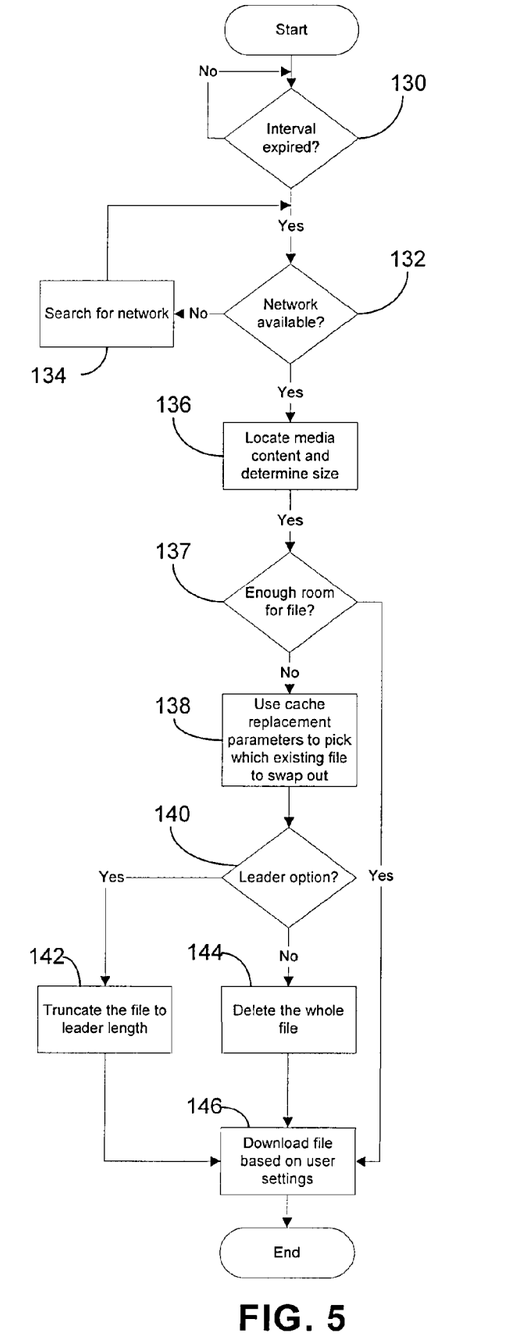
FIG. 5 is flow chart of an exemplary method of implementing the local media cache function in accordance with the invention.
Figure 6:
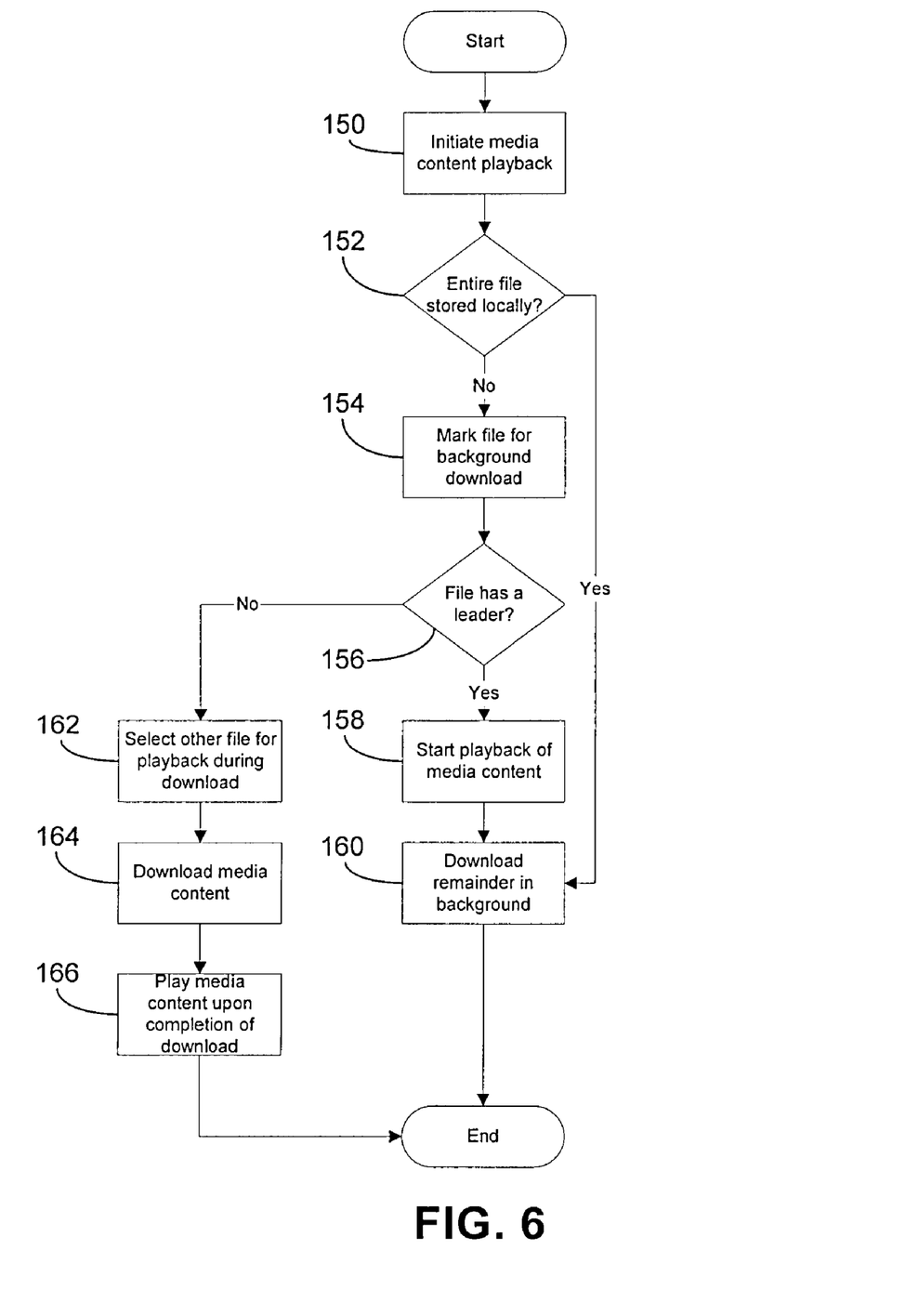
FIG. 6 is flow chart of an exemplary method of playing media content that has been cached on a mobile telephone in accordance with the invention.

Referring now to FIGS. 5 and 6, methods of implementing a local media cache function 22 on a mobile phone 10 are depicted. FIG. 5 provides exemplary steps for updating media content on the mobile phone, while FIG. 6 provides exemplary steps for playing back media content on the mobile phone. The exemplary methods of FIGS. 5 and 6 are presented in the context of caching media content in the form of music files. It will be appreciated that the method may be adapted to recommend other types of media content, including, for example, video content, textual content, image content, etc. in various forms of delivery (e.g., from memory on the mobile phone, via radio stations, podcasts, etc, to the user. Therefore, while the description herein refers to caching or otherwise transferring music files, the invention is not limited a single type of media or from a single type of source.

Further while the local media cache function 22 is described as residing primarily on the mobile phone 10, it may reside in other locations. For example, the media cache function 22 may reside entirely on the server 58, or on another PC (not shown). Once the media to be cached has been determined, the server 58 and/or PC may transfer the media content to the mobile phone 10. Additionally, portions of the functionality of the method may be carried out by the mobile phone 10 and portions of the functionality of the method may be carried out by the server 58. For example, the functionality of the method may be embodied as executable code, such as in the form of the local media cache function 22 and/or the local media cache support function 60, or any other suitable form, including software, firmware, dedicated circuit components, a program stored on a computer readable media or in machine usable medium, and so forth.

Although the illustrated method shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The method may begin in block 130 of FIG. 5 where it is determined if the interval for updating media content has expired. As noted herein, the frequency at which the local media cache function 22 provides new media content is user selectable (e.g., day, week, month, etc.). For example, if the user has selected weekly updates, and one week has not yet elapsed since the previous update, then the interval has not expired. If one week has elapsed since the last update, then the interval has expired.

If the interval has not expired, then the method moves back to block 130 and waits for a predetermined time period before rechecking the interval status. If the interval has expired, then the method moves to block 132 and determines if a network connection is available.

Determining if a network is available may be done using conventional techniques. Further, the network need not be a particular type of network, but may be any network that can be utilized by the mobile phone 10. For example, a network can be established via a Bluetooth connection between a plurality of mobile phones, mp3 players, etc. Alternatively, a network can be established using a WiFi connection (e.g., a wireless connection based on the 802.11x standard) between the mobile phone, a computer, an mp3 player, another mobile phone, etc. Further, a network connection may be established using the mobile phone's voice network to establish a link with an internet gateway. Regardless of how the network connection may be achieved, if a network connection is not available, then at block 134 the mobile phone continues to search for available networks.

If a network is available, then at block 136 the media content is located and the size of the file is determined using conventional techniques. Then, at block 137 it is determined if the available memory of the mobile phone 10 is sufficient to accept and store the entire media content (e.g., is the media content size greater than the free memory size in the mobile phone). If the memory available on the mobile phone 10 is sufficient to store the entire media content, then the method moves to block 146 and proceeds to download the media content to the mobile phone 10. If there is insufficient free memory available, then at block 138 cache replacement rules are used to determine which media content may be removed to make room for the new media content.

As described herein, selecting the media content to be replaced can be based on user specified replacement rules. For example, the user may rate the media content stored on the mobile phone 10 based on a scale from 1 to 10, wherein media content associated with lower numbers are to be deleted before media content associated with higher numbers. Thus, for example, if a particular media content is rated as a 2, and all other media content is rated as a 3 or higher, then the media content rated as a 2 will be the first to be replaced (i.e., at least partially deleted).

Another rating may be based on how often the media content was skipped in a queue. For example, if media content "A" was part of a play list, and when media content "A" started playing the user skipped to the next song, a counter associated with media content "A" can be incremented and stored in memory (e.g., as metadata). The counter associated with each media content then can be compared, and the media content with the highest skip count is the file chosen for replacement.

Yet another means for determining which existing media content should be replaced to make room for incoming media content is to monitor the last time the media content was played or otherwise executed. For example, each time media content is played on the mobile phone 10, the current date and time can be stored with the media content (e.g., as metadata). Then, when it comes time to replace media content to make additional room for incoming media content, the metadata can be checked to determine the last time the media content was played. Media content having the longest time span since being last played then can be marked for replacement.

Media content also may be marked for replacement based on how long the media content has resided in the mobile phone. This approach is analogous to a first-in-first-out (FIFO) buffer. Thus, when more space is needed for incoming media content, the oldest media content is replaced with the incoming media content.

As will be appreciated, other criteria for replacing/deleting media content may be established without departing from the scope of the invention. For example, the replacement or deletion of media content may be based on file size, artist name, genre, quality (e.g., bit rate), etc.

Once the replacement rules have been applied and the appropriate files marked (if necessary) for replacement, then at block 140 it is determined if the leader option is enabled. As noted above, a leader file is a file that includes at least part of the media content (e.g., a 30 second clip of the media content) that may be played on the mobile phone 10. During playback of the leader file, the remaining portion of the media content is downloaded or streamed to the mobile phone 10 in the background. Thus, even though the entire media content does not reside on the mobile phone 10, it appears to reside on the mobile phone to the user.

If leader files are not enabled, then at block 144 the files previously marked for replacement are deleted, and then at block 146 the new media content is transferred into memory of the mobile phone 10. If leader files are to be used, then at block 142 the file or files marked for replacement are truncated into leader files, and then at block 146 the new media content is transferred into memory of the mobile phone 10. Depending on the selected configuration, small or large leader files are created.

Moving now to FIG. 6, exemplary steps for playing back the media content stored in memory of the mobile phone 10 are shown. Beginning at block 150, playback of the media content is initiated (e.g., the user, via the display 14 and keypad 16, selects the media content for playback). Playback of media content, for example, may be one song at a time, or may be a queue of songs (e.g., a pre-created play list). At block 152, it is determined if the selected media content is entirely stored in memory of the mobile phone 10 or if only a portion of the media content is present (e.g., a leader file). If the entire media content is stored in the mobile phone 10, then at block 160, playback of the media content begins. However, if the entire media content is not stored in the mobile phone 10, then at block 154 the media content is marked for transfer.

At block 156, it is determined if the selected media content has a leader file (e.g., an executable portion of the media content). If a leader file is not present, then at block 162, another media content may be enabled for playback (e.g., the next song in the queue can be utilized). If no other media content is selected for playback, then a message may be displayed on the display 14 informing the user that the media content is being downloaded, and at block 164, the selected media content is downloaded to the mobile phone 10. Once the download is complete, the media content is played or otherwise executed at block 166. Moving back to block 156, if a leader file is stored on the mobile phone 10 for the selected media content, then at block 158 playback of the media content begins (e.g., via the leader file). Further, at block 160, the remaining portion of the media content is downloaded in the background as the media content is played. Thus, it appears to the user that the entire media content was stored on the mobile phone, when in fact only a portion of the media content actually was stored.

Accordingly, a device and method for caching media content based on replacement rules has been described. The device and method enable a user to enjoy a variety of high quality media content, without drawbacks associated with conventional techniques. Further, when the amount of free memory in the electronic equipment is limited, leader files can be used to provide the user with more playback options.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for providing media content to an electronic device, comprising:
    transferring media content to the electronic device, wherein at least part of incoming media content transferred to the electronic device is stored in memory of the electronic device for use at a later time;
    using rules to determine how pre-existing media content and the incoming media content are stored in memory of the electronic device when free memory in the electronic device is insufficient to store both the incoming media content and the pre-existing media content; and
    wherein determining how the pre-existing media content and the incoming media content are stored in memory includes
        replacing at least part of the pre-existing media content with the incoming media content, or transferring only a part of the incoming media content to the electronic device; and
        creating at least one leader file for i) pre-existing media content that has been at least partially replaced by the incoming media content or ii) incoming media content that has been partially transferred to the electronic device.

2. The method of claim 1, wherein transferring includes streaming the media content to the electronic device.

3. The method of claim 1, wherein using rules includes using weighting criteria to determine which pre-existing media content will be at least partially replaced by the incoming media content.

4. The method of claim 3, wherein using weighting criteria includes using rules based on at least one of age, use characteristics, a rating, a genre, a size, a play time, a quality, an artist or a title of the media content stored in memory.

5. The method of claim 4, wherein using rules based on use characteristics of the media content includes using rules based on a number of times the media content has been skipped during execution or on a time period on non-use of the media content.

6. The method of claim 1, wherein creating the at least one leader file includes creating a file executable to render a portion of the pre-existing media content.

7. The method of claim 6, further comprising transferring a remaining portion of the pre-existing media content as the leader file is executed.

8. The method of claim 1, wherein creating the leader file includes creating a file that is executable to render a portion of the transferred media content.

9. The method of claim 8, further comprising downloading a remaining portion of the media content not yet transferred to the electronic equipment as the leader file is executed.

10. The method of claim 1, wherein transferring includes automatically transferring media content to the electronic equipment at predetermined intervals.

11. The method of claim 1, further comprising at least one of selecting a source from which the media content is transferred, selecting a style of media content to be transferred to the electronic device, or enabling random selection of the transferred media content.

12. The method according to claim 1, wherein creating the leader file includes identifying a source from which a remaining portion of the pre-existing or partially transferred media content may be obtained, and storing the identified source in the leader file.

13. The method according to claim 1, wherein creating the leader file includes using at least part of the pre-existing or partially transferred media content to form the leader file.

14. An electronic device, comprising:
a processor and memory;
a radio circuit operative to establish wireless communications with other electronic devices;
a local media cache circuit operative to store at least part of incoming media content in memory and to apply rules to determine how pre-existing media content and the incoming media content are stored in memory when free memory in the electronic device is insufficient to store both the incoming media content and the pre-existing media content, wherein the local media cache circuit, to determine how the pre-existing media content and the incoming media content are stored in memory, is configured to
replace at least part of the pre-existing media content with the incoming media content, or transfer only a part of the incoming media content to the electronic device; and
create at least one leader file for i) pre-existing media content that has been at least partially replaced by the incoming media content or ii) incoming media content that has been partially transferred to the electronic device.

15. The electronic device of claim 14, wherein the local media cache circuit is operative to use weighting criteria to determine which pre-existing media content will be at least partially replaced by the incoming media content.

16. The electronic device of claim 14, wherein the local media cache circuit is operative to transfer a remaining portion of the pre-existing media content when the leader file is executed.

17. The electronic device of claim 14, wherein the local media cache circuit is operative to transfer a remaining portion of the incoming media content as the leader file is executed.

18. The electronic device of claim 14, wherein the local media cache circuit is operative to automatically transfer media content to the electronic device at predetermined intervals.

19. The electronic device of claim 14, wherein the electronic device is a mobile telephone.

20. The electronic device of claim 14, wherein the leader file is executable code that causes the processor to render a portion of the transferred media content or the pre-existing media content.

21. The electronic device of claim 14, wherein the leader file includes a source from which a remaining portion of the pre-existing or partially transferred media content may be obtained.

22. The electronic device of claim 14, wherein the leader file includes at least part of the pre-existing or partially transferred media content.

23. A non-transitory computer readable storage medium with an executable program stored thereon, wherein the program instructs a processor to perform the following steps:
transferring media content to an electronic device, wherein at least part of incoming media content transferred to the electronic device is stored in memory of the electronic device for use at a later time;
using rules to determine how pre-existing media content and the incoming media content are stored in memory of the electronic device when free memory in the electronic device is insufficient to store both the incoming media content and the pre-existing media content; and
wherein determining how the pre-existing media content and the incoming media content are stored in memory includes
replacing at least part of the pre-existing media content with the incoming media content, or transferring only a part of the incoming media content to the electronic device; and
creating at least one leader file for i) pre-existing media content that has been at least partially replaced by the incoming media content or ii) incoming media content that has been partially transferred to the electronic device.

* * * * *